HAMILTON & McKINNEY.
Fruit Gatherer.
No. 79,827.
Patented July 14, 1868.
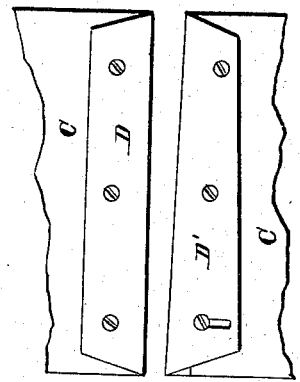
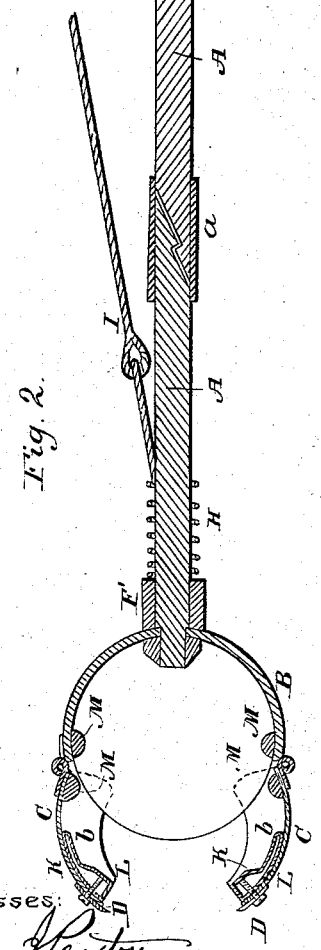
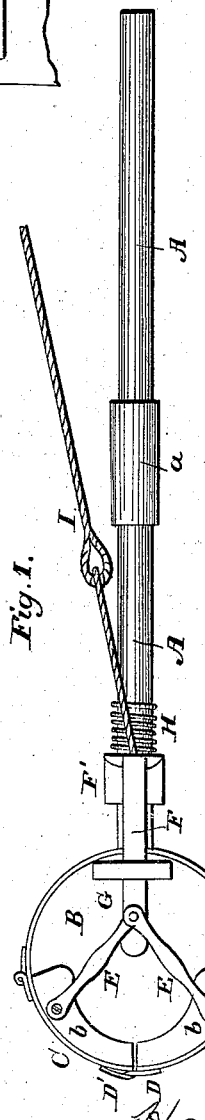

United States Patent Office.

O. COURT HAMILTON AND HARVEY McKINNEY, OF TURTLE CREEK, PENNSYLVANIA.

Letters Patent No. 79,827, dated July 14, 1868.

IMPROVEMENT IN FRUIT-GATHERER.

*The Schedule referred to in these Letters Patent and making part of the same.*

TO ALL WHOM IT MAY CONCERN:

Be it known that we, O. COURT HAMILTON and HARVEY McKINNEY, both of Turtle Creek, in the county of Allegheny, and State of Pennsylvania, have invented certain new and useful Improvements in Fruit-Gatherers, of which the following is a full, clear, and exact description, reference being had to the accompanying drawings, which make part of this specification, and in which—

Figure 1 represents a view, in elevation, of my improved fruit-gatherer.

Figure 2, a vertical section through the same; and

Figure 3 a plan or top view of the cutting-edges and part of the jaws.

It is the object of my invention to construct a fruit-gatherer, with which either to cut or pull fruit from a tree or vine, as may be desired, and which also serves as a box to hold and carry the fruit when gathered, and to these ends the improvements herein claimed consist—

First. In the combination, substantially as set forth, with a partly open box, of hinged jaws, which, when closed, cover the opening and form a complete box.

Second. In the combination, substantially as hereinafter described, with the receptacle and its jaws, of rounded strips inside the receptacle, to prevent the fruit from being bruised, and to keep its stems from entering the joints between the receptacle and jaws.

In the accompanying drawings, A A represent the two sections of the handle, united by fitting their notched, inclined, or bevelled ends together, and slipping the slide $a$ in place upon them. This handle supports a box, B, to the outside of which jaws C C are hinged, to the edges of which jaws are secured, by screws, knives or blades D D'. The blade D' has a diagonal edge, so as to make a shearing cut as the jaws are closed. The jaws project at their ends beyond the receptable B, and have flanges, $b$, which guide them in their up-and-down movements and give them additional strength. To these flanged edges rods E are pin-jointed, and are similarly connected at their opposite ends to rods F, on each end of the box, and attached to a cross-piece or stop, F', sliding on the handle at their lower ends, and also slide in guides, G, near the bottom of the box.

A coiled spring, H, secured at its lower end to and embracing the handle, presses against the stop F', and keeps the jaws open until the rope I, fastened to the stop, is pulled, which closes them.

The jaws have their edges beneath the blades lined with rubber or other suitable soft material, secured in place by the screws which fasten the blades entering the pieces, L, of wood or other substance, enclosed in the lining K.

In the drawings these screws are shown as adapted to be used with washers of corresponding thickness with the knives, when the knives are removed, but it is obvious that the use of shorter screws would render washers unnecessary when the cutting-edges are not used.

Rounded strips, M, are secured upon the inside of the jaws and box on each side of the joints, between them. These strips push the fruit away from the joints without injury to it, owing to the sliding or rolling pressure exerted in closing the jaws. By thus removing the fruit from the cracks, the projecting stems upon it are kept from entering them.

These strips may be of wood or metal, with or without being covered with soft material, or they may, with better results, be composed of rubber or other yielding substance.

The blades may be removed when it is desired to sharpen them, or to pull the fruit by force from the tree or vine, which can be done without injury with the soft edges of the jaws.

It is obvious that one jaw, with padded or cutting-edge, moving towards and from a fixed blade or lined edge, could be used without departing from the spirit of our invention.

What we claim as our invention, and desire to secure by Letters Patent, is—

1. The combination, substantially as set forth, with a partly open box, of jaws, hinged near the edges of the opening, which jaws, when closed, complete the box, and thus prevent the spilling of the fruit.

2. The combination, substantially as set forth, with the receptacle and jaws, of the rounded internal strips, to prevent the crushing of the fruit or the clogging of the jaws.

In testimony whereof, we have hereunto subscribed our names.

O. COURT HAMILTON.
HARVEY McKINNEY.

Witnesses:
JAMES S. McKEEVER,
JACOB H. JOHNSTON.